United States Patent
Kubanek et al.

[15] 3,692,775
[45] Sept. 19, 1972

[54] RACEMIZATION OF D-OR L-α-AMINO-CAPROLACTAM IN THE PRESENCE OF METAL IONS

[72] Inventors: Anne-Marie Margaretha Kubanek, Basking Ridge; Young Chul Kim, Parsippany, both of N.J.

[73] Assignee: Allied Chemical Corporation, New York, N.Y.

[22] Filed: March 17, 1969

[21] Appl. No.: 808,003

Related U.S. Application Data

[63] Continuation-in-part of Ser. No. 780,287, Nov. 29, 1969, abandoned.

[52] U.S. Cl. ......... 260/239.3 R, 260/334, 260/361 A, 260/558 A, 260/326.5 FL, 260/563 R
[51] Int. Cl. .............................................. C07d 41/06
[58] Field of Search ............................ 260/239.3, 361 A, 558 A, 326.5 FL, 260/563 R, 239.3 R

[56] References Cited

UNITED STATES PATENTS

| | | |
|---|---|---|
| 3,275,619 | 9/1966 | Brenner et al. .......... 260/239.3 |
| 3,297,637 | 1/1967 | Akabori et al. ............. 260/534 |
| 3,458,568 | 7/1969 | Ogasawara et al. ......... 260/534 |
| 3,297,637 | 1/1967 | Akabori et al. ............. 260/534 |
| 3,458,568 | 7/1969 | Ogasawara et al. ......... 260/534 |

OTHER PUBLICATIONS

Hirota et al. " Bull Chem Soc Japan" Vol 40 pages 178– 184 (1967)
Elias et al. " Makromal Chemie" Vol. 102 pages 202–16 (1967)
Eliel " Stereochemistry of Carbon Compounds" (McGraw-Hill) (1962) pages 32– 38

*Primary Examiner*—Henry R. Jiles
*Assistant Examiner*—Robert T. Bond

[57] ABSTRACT

This invention relates to a method of racemizing enantiomers of compounds containing the group

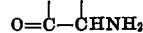

particularly enantiomers of α-amino-E-caprolactam, by contacting said enantiomers with ions of aluminum, chromium, cobalt, copper, indium, nickel, palladium, or zinc, preferably by dissolving salts of said metals in solutions of said enantiomers.

9 Claims, No Drawings

RACEMIZATION OF D- OR L-α-AMINO-CAPROLACTAM IN THE PRESENCE OF METAL IONS

CROSS-REFERENCE TO RELATED APPLICATIONS

This application is a continuation-in-part of our copending, commonly assigned application, Ser. No. 780,287, filed Nov. 29, 1969, now abandoned.

BACKGROUND OF THE INVENTION

Often, because of differences in certain properties, e.g., physiological properties, one enantiomer (optical isomer) of a compound having D- and L-forms is preferred over the other enantiomer of that compound. It would be useful, therefore, to be able to convert, i.e., racemize, the nonpreferred enantiomer to a racemic mixture containing both enantiomers from which, by methods known to those skilled in the art, the preferred enantiomer can then be isolated. For example, lysine, an essential amino acid, exists in D- and L-forms. D-Lysine has no nutritional value. In preparing dietary supplements, therefore, racemic lysine, i.e., a 50/50 mixture of D- and L-lysine, is resolved, that is, fractionated into D-lysine and L-lysine. The separated D-lysine fraction is useless as such, but if it could be racemized back into a D,L-lysine racemic mixture and the valuable L-lysine enantiomer recovered from this second racemic mixture, essentially all the D-lysine could be eventually transformed into the desired L-form. Of course, for other compounds, the D-enantiomer may be the useful one and, hence, in such cases it would be the L-enantiomer of such compound that would be racemized.

It is an object of this invention to provide a method of racemizing either the D- or the L-enantiomer of certain hereinafter-defined compounds.

It is a further object of this invention to provide a method of racemizing either enantiomer of α-amino-ε-caprolactam.

It has now been found in accordance with the instant invention that the D- or the L-enantiomer of compounds containing the group

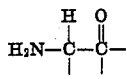

can be racemized by contacting said enantiomer with ions of certain hereinafter-defined metals. The racemization procedure of the instant invention is applicable to either the D- or the L-enantiomer of a compound, or to nonracemic mixtures of both enantiomers, i.e., mixtures richer in either the D- or the L-form.

The metals whose ions can be employed to effect such racemization are aluminum, chromium, cobalt, copper, indium, nickel, palladium, and zinc, preferably chromium, nickel, palladium and zinc. Mixtures of two or more of the above metal ions can also be employed. The metal ion can be in either the +2 or the +3 valence state where it is stable in both valence states or in either one of the two valence states when the metal ion is stable in only one.

The mol ratio of enantiomer to metal ion ranges from a minimum of 3:1 for hexa-coordinated metals and 2:1 for tetra-coordinated metals to about 200:1. The preferred ratio of enantiomer to metal ion for both tetra- and hexa-coordinated metals ranges from about 6:1 to about 50:1. At ratios of greater than 200:1 racemization will occur but the rate is impractically slow.

The terms hexa- or tetra-coordinated, as used in the instant application, connotes that the metal ion has 6 or 4 coordination sites, respectively. The coordination sites, or Werner number, of a cation is the total number of a given anion or molecule which can be directly associated with the cation when such associating moiety is monodentate and a multiple thereof when such moieties are polydentate. The enantiomer compounds of the instant invention are all bidentate. Therefore, a hexa-coordinated metal can be associated with three molecules and a tetra-coordinated with two of such compounds.

The enantiomer and metal ion may be contacted with each other by various conventional methods, preferably by dissolving salts of the above-defined metals in an enantiomer-containing medium such as an enantiomer melt or an enantiomer solution, preferably the latter.

Suitable solvents for the preparation of enantiomer solutions include the following solvents or mixtures thereof: (a) water; (b) alcohols which dissolve greater than 2 volume per cent water at 20° C., including, for example, alcohols such as methanol, ethanol, allyl alcohol, ethylene glycol, diethylene glycol, glycerol, and 2-methoxy ethanol. Preferably the solvent is methanol, ethanol, or a mixture thereof, especially methanol or ethanol containing less than 10 volume per cent water, including anhydrous methanol or ethanol.

The particular salt of the metal chosen is not of particular significance as it does not influence the racemization. The only requirement is that it dissolve without decomposition in the enantiomer-containing medium at the operating temperature to the extent necessary to provide the desired ion/enantiomer ratio. Preferably, chloride or nitrate salts are utilized.

The racemization reaction of the instant invention can take place at any temperature between the freezing point of the enantiomer-containing medium and the point at which said medium boils under the prevailing pressure conditions. The racemization reaction is essentially unaffected by pressure and, thus, for convenience is preferably run at atmospheric or slightly above atmospheric pressure. With an enantiomer solution, a reaction temperature approaching the boiling temperature of the medium is usually preferred because the racemization rate increases with increasing temperature; however, too high a temperature can in some instances cause adverse side reactions such as hydrolysis. The preferred temperature range is from about 60° C. up to about 150° C. The especially preferred temperature range is from about 80° C. to about 110° C.

While we do not wish to be bound by a particular mechanistic interpretation, it is believed that on contacting, the enantiomer forms a chelate with the metal ion— each molecule of enantiomer occupying two of the coordination sites of the metal ion. The chelate formation is believed to effect the racemization. Since the formation of the chelate is an eqilibrium process, even in a medium containing a molecular ratio of enantiomer to metal of exactly 3:1 for hexa-coordinated metals and 2:1 for tetra-coordinated metals, all the coordination sites of all the metal ions are not fully occupied and there is present in the medium, at any instant, some small amount of unchelated enantiomer. The presence of at least some unchelated enantiomer appears necessary for the formation of the racemic modification. Of course, at higher enantiomer/ion ratios, a greater amount of unchelated enantiomer is invariably present.

The time required to effect total racemization, i.e., for the transformation of 100 percent D- or L-enantiomer into 50/50 D,L-racemic mixture, depends upon the reaction medium used, the type and amount of metal ion present, the temperature at which the reaction is run, and, of course, upon the compound being racemized. Even when the racemization rate is slow, the racemic mixture will eventually be reached if given sufficient time. However, factors such as time available and cost may dictate terminating the racemization prior to total racemization, i.e., prior to obtaining a 50/50 racemic mixture.

After termination of the racemization, the chelate can be decomposed and the metal ion separated from the enantiomer-containing mixture by such conventional methods as ion exchange chromatography, precipitation of the metal ion as an insoluble salt, solvent extraction, etc. If desired, the chelate can be recovered as such and stored until decomposition thereof is desired.

The compounds which can be racemized by the process of the instant invention are compounds having the following formulas:

(I)
$$\begin{array}{c} NH_2 \\ | \\ H-C-X_1 \\ | \\ O=C-X_2 \end{array}$$

wherein $X_1$ is a hydrocarbon radical of up to 22 carbon atoms, preferably of up to 12 carbon atoms, said hydrocarbon radical being a substituted- or unsubstituted, straight or branched chain aliphatic, alicyclic or aromatic radical. If aliphatic or alicyclic, said radical can be saturated or unsaturated; $X_2$ is an amino or a hydrocarbon radical, if $X_2$ is a hydrocarbon radical, it is defined identically to, but selected independently of, $X_1$.

Illustrative compounds having the above formula include, for example, α-amino amides such as alanine amide, phenyl glycine amide; and α-amino ketones such as 4-amino-1-penten-3-one, 1-amino-1-cyclodecyl-propan-2-one, 2-amino-4-chloro-tridecan-3-one, and 2-amino-heneicosan-3-one.

(II) 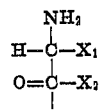

wherein $n$ is an integer from 1 to 20 and $X_3$ and $X_4$ are radicals selected, independently of any other $X_3$ and $X_4$ in the compound, from the group consisting of hydrogen, hydroxy, halogen, amino, mercapto, and hydrocarbon radicals, if $X_3$ or $X_4$ is a hydrocarbon radical any of said $X_3$ or $X_4$ can be connected to the ring carbon atom either directly or through an intervening oxygen, sulfur or NH group and said hydrocarbon radical can be substituted or unsubstituted; straight or branched chain aliphatic or alicyclic, or aromatic having from one to 22 carbon atoms, preferably from one to 12 carbon atoms. If aliphatic or alicyclic, said radical can be saturated or unsaturated. Illustrative compounds having the above formula include, for example, α-amino-E-caprolactam; 3-amino-5-ethoxy-2-pyrrolidone; 2-amino-3,4-dihydroxy-E-caprolactam; 3-amino-4-chloro-2-pyrrolidone; 2-amino-3(1-chlorodecyl)-E-caprolactam; 3-amino-4-ethenyl-2-pyrrolidone; and 2-amino-3-thiomethoxy-E-caprolactam. The compound especially suitable in the practice of the present invention is α-amino-E-caprolactam.

(III) 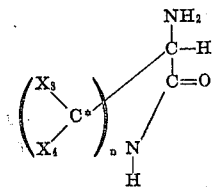

wherein $n$, $X_3$ and $X_4$ are as defined above for compound II.

Illustrative compounds having this structure include, for example, α-aminocyclohexanone; 2,4-diamino-cyclooctanone; 2-amino-5-mercapto-cycloheptanone; 2-amino-3,3-dioctadecyl-cyclopentanone; 2-amino-3-phenyl-4-cyclohexyl-cyclopentanone; and 2-amino-4-N-methylamino-cyclonoadecanone.

The invention can be more fully understood by reference to the following examples. All parts are parts by weight unless otherwise expressly noted.

EXAMPLE 1

To 100 cc aerosol compatibility tubes containing 5 cc of a solvent were added L-α-amino-E-caprolactam and a metal salt as described below in Table I. The closed tubes were heated in an oil bath held at 95° C. for from 2–5 hours during which time the solutions were stirred with a magnetic rod. The solutions were then cooled and 3 cc of 5N HCl was added to each. Each solution was diluted with additional solvent to 10 cc in volumetric flasks and the optical rotation was measured for each solution at 25° C. with a polarimeter. A blank test of rotation of L-α-amino-E-caprolactam gave a specific rotation, $[\alpha]_D^{25}$, of −22.8° for a methanol and −21.2° for a water solution. Percent conversion can be calculated by the formula.

$$100 = \frac{100[\alpha]_D^{25}}{[\alpha]_D^{25}}$$

where $[\alpha]_D^{25}$ equals the specific rotation value of the test solution. Note that conversion to the racemic modification, i.e., $[\alpha]_D^{25} = 0$, gives a conversion value of 100 percent.

TABLE I.—RACEMIZATION OF L-α-AMINO-E-CAPROLACTAM IN THE PRESENCE OF METAL ION AT 95° C.

| L-α-amino-E-caprolactam (millimols) | Metal salt | Coordination numbers of metal | Metal ion (millimols) | Solvent | Time (hr.) | $[\alpha]_D^{25}$ degrees | Calculated conversion (percent) |
|---|---|---|---|---|---|---|---|
| 1.56 | $NiCl_2$ | 6 | 0.39 | MeOH[1] | 4 | $+0.6\pm1.5$ | 100 |
| 1.0 | $NiCl_2 \cdot 6H_2O$ | 6 | 0.1 | $H_2O$ | 2 | $-13.3\pm0.8$ | 37 |
| 1.0 | $NiCl_2$ | 6 | 0.1 | MeOH[1] | 2 | $-0.5\pm0.3$ | 100 |
| 1.0 | $NiCl_2$ | 6 | 0.025 | MeOH[1] | 2 | $-10.0\pm0.5$ | 56 |
| 1.56 | $CoCl_2 \cdot 6H_2O$ | 6 | 0.1 | MeOH[1] | 5 | $-6.3\pm1.6$ | 72 |
| 1.0 | $CrCl_3 \cdot 6H_2O$ | 6 | 0.1 | MeOH[1] | 5 | $-1.3\pm2.7$ | 100 |
| 1.0 | $ZnCl_2$ | 4 | 0.1 | MeOH[1] | 5 | $-2.8\pm1.1$ | 88 |
| 1.0 | $AlCl_3 \cdot 6H_2O$ | 6 | 0.1 | MeOH[1] | 5 | $-7.0\pm0.8$ | 69 |
| 1.0 | $PdCl_2 \cdot 2H_2O$ | 4 | 0.1 | MeOH[1] | 5 | $-0.2\pm0.5$ | 100 |
| 1.0 | $InCl_3$ | 6 | 0.1 | MeOH[1] | 5 | $-9.6\pm0.5$ | 58 |
| 1.0 [2] | | | | MeOH[1] | 5 | $-22.5\pm0.5$ | 0 |

[1] MeOH was anhydrous methanol.
[2] Control run.

EXAMPLE 2

The procedure of Example 1 is repeated with the exception that no solvent is added to the compatibility tubes; the reaction taking place in liquid L-α-amino-E-caprolactam which, at 95° C., is well above its melting point. Racemization takes place, as in Example 1, although the percent conversions obtained may be different than those of Example 1.

EXAMPLE 3

The procedure of Example 1 is repeated using the other enantiomer, D-α-amino-E-caprolactam. Within the limits of experimental error, results identical to those of Example 1 are obtained.

EXAMPLE 4

The procedure of Example 1 is repeated using those solvents listed below. Racemization takes place, as in Example 1, although the percent conversions obtained may be different than those of Example 1.

Solvents: methanol + 10 volume percent water; anhydrous ethanol; ethanol + 10 volume percent water; allyl alcohol; ethylene glycol and 2-methoxyethanol.

EXAMPLE 5

The procedure of Example 1 is repeated using the corresponding sulfate and nitrate salts of those metals listed in Table I. Results substantially similar to those of Example I are obtained.

EXAMPLE 6

The procedure of Example 1 is repeated using the enantiomers of those compounds listed below, each of which contains a O=C—CHNH$_2$ group.

Racemization takes place, as in Example 1, although the percent conversions obtained may be different than those of Example 1.

Compounds Racemized: alanine amide; phenyl glycine amide; 4-amino-1-penton-3-one; 3-amino-5-ethoxy-2-pyrrolidone; 3-amino-4-chloro-2-pyrrolidone-aminocyclohexanone; and 2-amino-5-mercapto-cycloheptanone.

EXAMPLE 7

Di—ACL*(*ACL = α-amino-E-caprolactam)—Cupric Chloride

Racemic ACL (0.01 mol) and anhydrous $CuCl_2$ (0.005 mol) were dissolved separately each in 30 cc of anhydrous acetone and the acetone solutions mixed at room temperature. The chelate crystallized out as a blue powder: yield 84 percent; melting point (mp) 184.4° C. The X-ray powder diagram showed that the chelate was crystalline. The nuclear magnetic resonance (NMR) spectrum (in $D_2O$) gave one extremely broad band, indicating that the chelate was paramagnetic.

Elemental Analysis: calculated for $C_{12}H_{24}N_4O_2CuCl_2$
Theory: C = 36.88; H = 6.19; N = 14.34; Cu = 16.26; Cl = 18.14
Found: C = 37.21; H = 6.26; N = 14.56; Cu = 15.8; Cl = 18.31

Infrared (IR) (KBr pellet) showed strong absorption bands at $3,150^{cm}+^1$(NH); $1,625^{cm}+^1$(C=O); $1,600^{cm}+^1$ (NH$_2$).

Ultraviolet and visible spectrum (λmax in $CH_3OH$) 660(E*(*E = extinction coefficient.)58.7); 330–340 and 230–240 (shoulders) millimicrons (mμ).

EXAMPLE 8

Tri—ACL—Nickel$^{++}$Chloride

A solution of 0.012 mol of racemic ACL in ethanol (25 cc) was added to a stirred slurry of anhydrous $NiCl_2$ in ethanol (25 cc). The $NiCl_2$ went into solution upon heating the mixture to 60°–70° C., and the solution then turned blue. The chelate precipitated on addition of 200 cc of anhydrous ether. The yield of chelate was quantitative. The chelate turned dark upon heating but did not melt when heated up to 300° C. The NMR spectrum (in $CD_3OD$) was broad and indistinct indicating the chelate was a pramagnetic structure. The chelate was a blue powder, crystalline by X-ray powder diagram; however, larger crystals can be obtained by crystallization from ethanol upon standing for a long period.

Elemental Analysis: calculated for $C_{18}H_{36}N_6O_3NiCl_2$
Theory: C = 41.90; H = 7.03; N = 15.57; Ni = 11.38; Cl = 13.74
Found: C = 41.89; H = 7.58; N = 16.47; Ni = 11.6; Cl = 13.8

IR(KBr pellet) showed strong absorption bands at $3,250^{cm}+^1 1,627^{cm}+^1$(C—O), $1,600^{cm}+^1$(NH$_2$); visible and U.V. spectra λmax (in $CH_3OH$); 605(E 4.5); 355(E11.8) mu.

EXAMPLE 9

Tri—L—ACL*(*L-ACL = L-enantiomer of aminocaprolactam)—Nickel$^{++}$Chloride

NiCl$_2$ (0.0015 mol) and L—ACL 0.0045 mol were stirred together for 30 minutes in 25 cc of ethanol. The pale blue precipitate which formed was filtered off and dried affording a 65 percent yield of the tri-chelate, mp>300°C. The U.V. — visible spectrum was identical to the spectrum of racemic-ACL-trichelate (when run in MeOH and H$_2$O).

Elemental Analysis: calculated for C$_{18}$H$_{36}$N$_6$O$_3$NiCl$_2$
Theory: C = 41.90; H = 7.03; Ni = 11.38; Cl = 13.74
Found: C = 41.40; H = 7.26; Ni = 11.1; Cl = 13.8
The IR spectrum (KBr pellet) showed strong absorption bands at 3,250$^{cm^{-1}}$(NH), 1629$^{cm^{-1}}$(C=O), 1,600$^{cm^{-1}}$).

Various modifications will be apparent to those skilled in the art and it is not intended that this invention be limited to the details in the specific examples presented by way of illustration. Accordingly, the scope of the invention is limited only by the appended claims.

We claim:

1. A process for racemizing the D- or L-enantiomer of α-amino-E-caprolactam, comprising contacting said enantiomer with ions in the plus 2 or plus 3 valence state of aluminum, chromium, cobalt, copper, indium, nickel, palladium, zinc, and mixtures thereof, the ratio of said enantiomer to said metal ions ranging from at least about 3:1 for ions of hexa-coordinated metals and from about 2:1 for ions of tetra-coordinated metals up to about 200:1.

2. A process in accordance with claim 1, wherein said metal is chromium, nickel, palladium, zinc, or a mixture thereof.

3. A process in accordance with claim 1, wherein said enantiomer and said metal ions are contacted by dissolving a salt of said metal in a melt of said enantiomer.

4. A process in accordance with claim 1, wherein said enantiomer and metal ions are contacted by dissolving a salt of said metal in an enantiomer-containing solution comprising said enantiomer and a solvent selected from the group consisting of water, alcohols which dissolve greater than 2 volume per cent of water at 20° C., and mixtures thereof.

5. A process in accordance with claim 4, wherein said alcohol is methanol or ethanol.

6. A process in accordance with claim 4, wherein the temperature of said solution during contacting ranges from about 80° C. to about 110° C.

7. Di-α-amino-E-caprolactam Cupric Chloride.

8. Tri-α-amino-E-caprolactam-Nickel$^{++}$Chloride.

9. Tri-L-α-amino-E-caprolactam-Nickel$^{++}$Chloride.

* * * * *